May 30, 1961 C. R. GOLLNICK 2,986,290
MATERIAL COLLECTING VEHICLE
Filed March 29, 1957 3 Sheets-Sheet 1
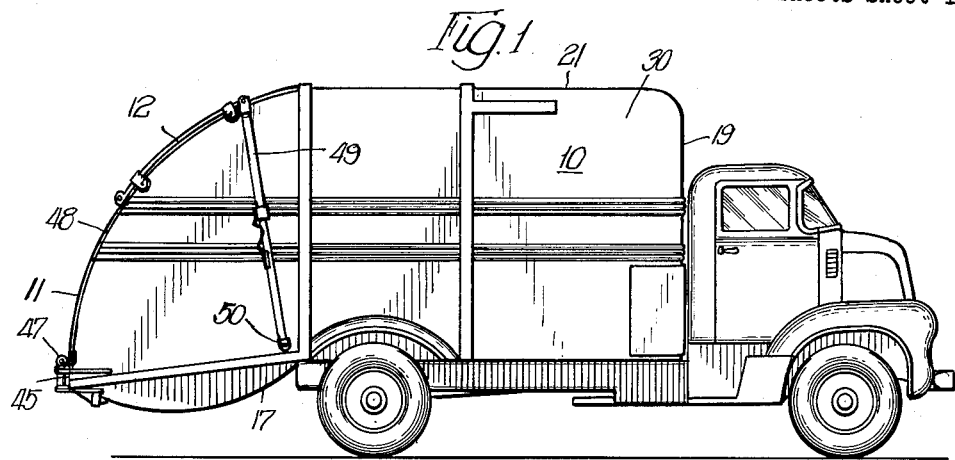
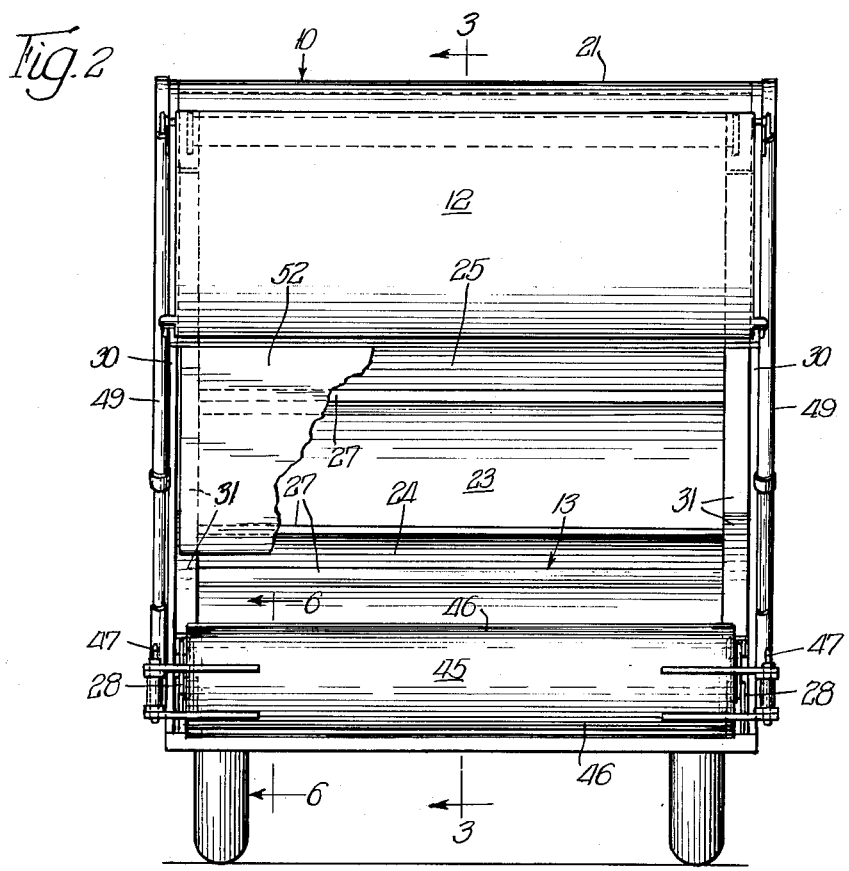
INVENTOR.
Cyril R. Gollnick,
BY
Cromwell, Greist & Warden
Attys.

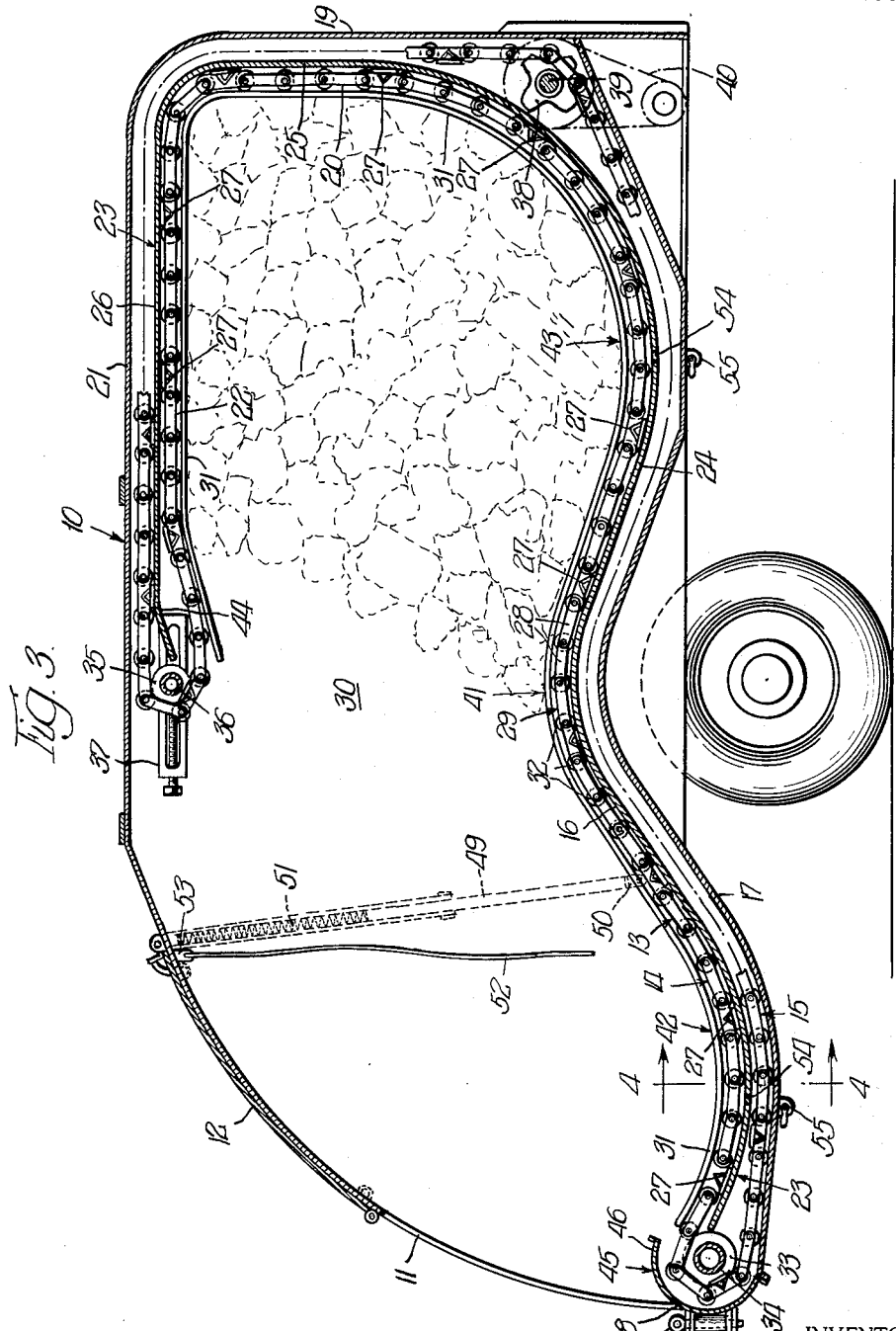

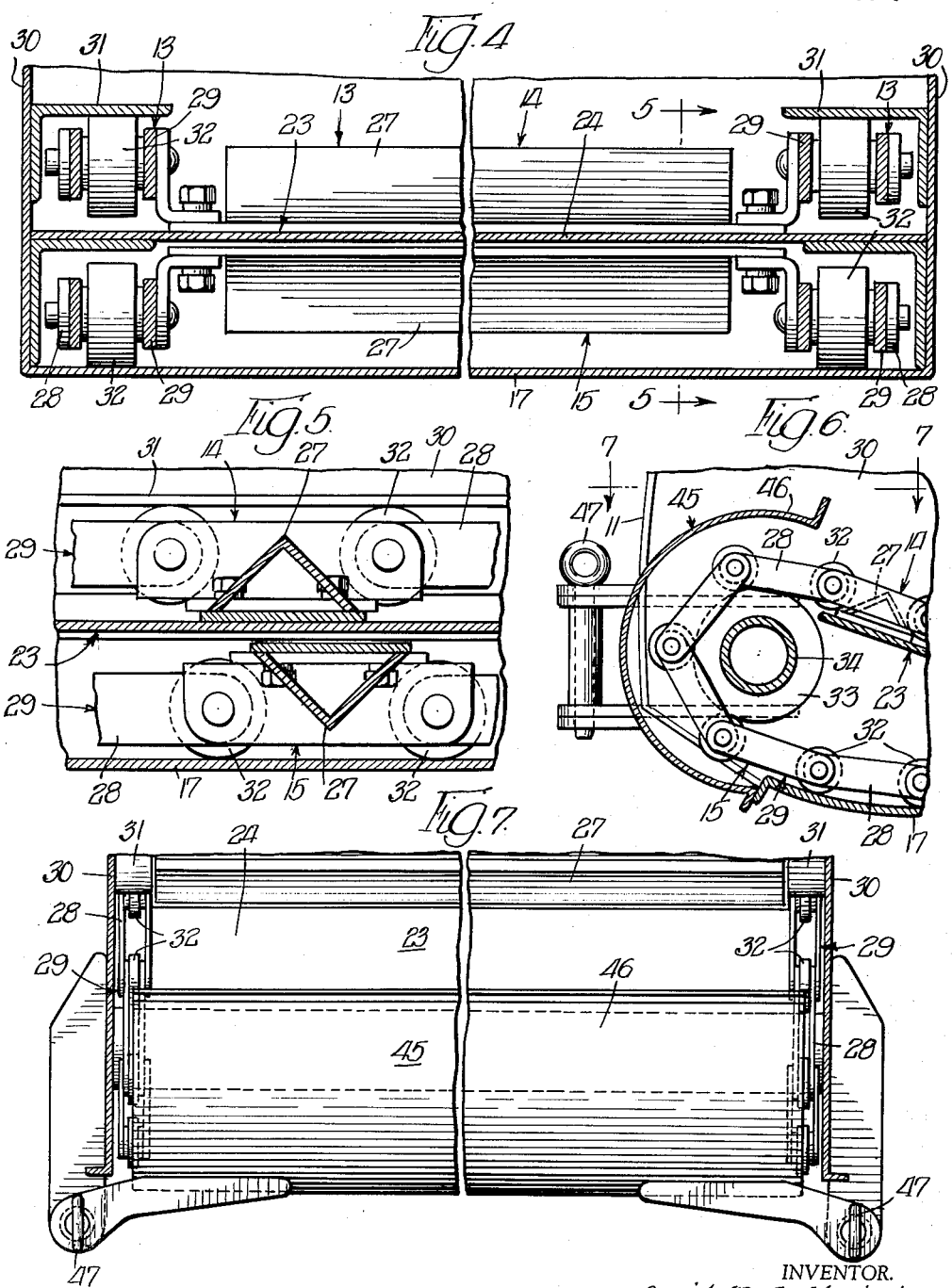

United States Patent Office 2,986,290
Patented May 30, 1961

2,986,290
MATERIAL COLLECTING VEHICLE
Cyril R. Gollnick, Oshkosh, Wis., assignor to Leach Company, Oshkosh, Wis., a corporation of Wisconsin
Filed Mar. 29, 1957, Ser. No. 649,357
9 Claims. (Cl. 214—83.36)

This invention has to do with material collecting vehicles of the type commonly used in the handling of garbage, trash and other refuse.

The purpose of the invention is to provide a new and improved material collecting vehicle of this type which is simple in construction and operation, can be manufactured at low cost, and permits of the handling of large quantities of material by reason of its novel compressing or compacting action on the same.

While the foregoing statement is indicative in a general way of the nature of the invention other objects and advantages will be apparent upon a full understanding of the nature of the vehicle.

A preferred embodiment of the invention is presented herein by way of exemplification but it will of course be appreciated that the invention is susceptible of being embodied in other structurally modified forms coming equally within the spirit of the invention and the scope of the appended claims.

In the accompanying drawings:

Fig. 1 is a side view of a material collecting vehicle constructed in accordance with the invention;

Fig. 2 is a rear end view of the vehicle;

Fig. 3 is a longitudinal section through the vehicle, taken on approximately the line 3—3 of Fig. 2;

Fig. 4 is a transverse vertical section, taken on approximately the line 4—4 of Fig. 3;

Fig. 5 is a transverse vertical section, taken on approximately the line 5—5 of Fig. 4;

Fig. 6 is a longitudinal vertical section, taken on approximately the line 6—6 of Fig. 2; and Fig. 7 is a horizontal section, taken on approximately the line 7—7 of Fig. 6.

As will be observed in the drawings, the vehicle includes a large capacity storage body 10 which is provided at its rear end with an opening 11. The opening 11 is of substantially the same width as the body and is provided with a vertically movable door 12, which door is adapted to be raised into an out-of-the-way position during the loading and also during the unloading of the body. The body 10 contains an endless conveyor 13 which is of substantially the same width as the body. The conveyor 13 is characterized by a refuse-engaging stretch 14 and a return stretch 15.

The refuse-engaging stretch 14 of the conveyor has a long upwardly facing section 16 which extends forwardly in the body 10 along the bottom 17 thereof from a starting point adjacent the lower edge 18 of the opening 11 to a point adjacent the front end 19 of the body, where it curves gradually upward. From the front upwardly curved end of the forwardly extending section 16 the refuse-engaging stretch 14 continues upwardly in an upwardly extending section 20 to a point adjacent the top 21 of the body, where it curves gradually rearward. And from the upper rearwardly curved end of the upwardly extending section 20 the refuse-engaging stretch 14 continues rearwardly in a relatively short rearwardly extending section 22, which rearwardly extending section is located above the forward portion only of the forwardly extending section 16 in downwardly confronting relation to the latter.

The return stretch 15 of the conveyor 13 follows substantially the same path as the refuse-engaging stretch 14, but in reverse direction.

The refuse-engaging and return stretches 14 and 15 of the conveyor are separated from each other by an inner shell, in the form of a rigid refuse-engaging plate 23, which follows the same path. The section 24 of the plate 23 which underlies the forwardly extending section 16 of the refuse-engaging stretch 14 of the conveyor is spaced above the bottom 17 of the body far enough to provide room for the accommodation of the underlying section of the return stretch 15, and the continuing sections 25 and 26 of the plate 23, which respectively back up the upwardly and rearwardly extending sections 20 and 22 of the refuse-engaging stretch 14 of the conveyor, are similarly spaced from the front end 19 and top 21 of the body, for the same purpose.

The conveyor 13 consists of a plurality of spaced parallel cross bars 27 which are preferably of V-shaped cross section. The bars 27 span substntially the full width of the body and are connected at their ends to certain of the links 28 of two side chains 29. The chains 29 are arranged along the sides 30 of the body and are guidingly supported in their travel by flanges 31 on the sides of the body, which flanges follow the curvature of the plate 23 in closely spaced relation to the latter and are adapted to engage with anti-friction rollers 32 which are mounted between the links 28 of the chains. The cross bars 27 of the conveyor travel along the surface of the plate 23 and cause the refuse on the plate to be moved in the direction of travel of the conveyor.

At the rear or receiving end of the long forwardly extending section 16 of the refuse-engaging stretch 14 the chains 29 are trained about idler wheels 33 which are secured to the ends of a cross shaft 34, and at the rear end of the short rearwardly extending top section 22 of the refuse-engaging stretch 14 the chains 29 are trained about idler wheels 35 which are secured to the ends of another cross shaft 36. The cross shafts 34 and 36 are rotatably mounted in suitable bearing brackets carried by the sides 30 of the body, and the bearing brackets for the cross shaft 36 are adjustably positioned by means of take-up devices 37, which devices are used to either loosen or tighten the chains 29, as desired.

The chains 29 are driven by sprocket wheels 38 which are secured to the ends of another cross shaft 39. The shaft 38 is located in the lower front portion of the body 10, between the upwardly turned section of plate 23 and the front end 19 of the body, and is rotatably mounted in suitable bearing brackets carried by the sides of the body. The cross shaft 39 is driven through reduction gearing 40 from a source of power, preferably that of the vehicle. Suitable hand operable control means (not shown) are provided in association with this drive mechanism for the purpose of starting and stopping at will the movement of the conveyor 13 and also for the purpose of reversing at will its direction of travel.

The section 24 of the plate 23 which underlies the long forwardly extending section 16 of the refuse-engaging stretch 14 of the conveyor, and the chain guiding flanges 31 which extend along the sides of that section of the plate, are gradually curved, first upwardly and then downwardly, intermediate their ends to provide a crest-like elevation 41, which intermediate elevation results in the production of a pocket-like depression 42 in the conveyor behind such elevation for the initial reception of the refuse, and results in a similar but larger pocket-like depression 43 in the conveyor in front of such elevation into which the refuse is carried by the conveyor and progressively compacted or compressed on itself. The rear end of the top section of the plate 23 which backs up the short rearwardly extending top section of the refuse-enggaging stretch 14, and the rear ends of the guide flanges 31, are preferably inclined downwardly and rearwardly for a short distance at 44 to assist in directing piled up refuse downwardly again in front of the elevation 41.

A sill member 45 is preferably secured to the rear end of the body 10 adjacent the lower edge of the opening 11 in the latter, in shielding relation to the receiving end of the refuse-engaging stretch 14 of the conveyor. In addition to affording protection with respect to that end of the conveyor, the upper part of the sill member presents a surface 46 on which portable collection containers of various sorts can be rested and fulcrumed while their contents are being dumped through the opening 11 into the body. The sill member is preferably of rounded semicircular cross section, in order to fit closely with a minimum of clearance about the corresponding rounded rear end of the conveyor.

The sill member 45 is attached at its ends to the body by means of two removable hinge pins 47. If it is desired to remove the sill member completely when the body is being unloaded, both of the pins 47 are withdrawn, whereas if it is desired to merely swing the sill member into an out-of-the-way position when the body is being unloaded, only one of the pins is withdrawn, leaving the other pin to act as a pivot about which the sill member will swing.

The door 12 for the opening 11 is adapted, in its lowered position, to close against the sill member 45. The rear end of the body 10 at and above the opening 11 is preferably curved upwardly and forwardly, and the door 12 is correspondingly curved in order to fit closely with the margins of the opening. The door 12 is slidable upwardly and downwardly in suitable guides 48 at the sides of the opening 11, and is attached at its upper corners to the upper ends of two two-part telescoping lever arms 49. The arms 49, which are pivoted at 50 to the sides of the body, contain springs 51 which act between the two telescoping parts of the arms to assist in raising the door and also to counterbalance the weight of the door in its raised position.

In the operation of the vehicle the door 12, if not already open, is raised and the refuse which is to be collected and transported is dumped through the opening 11 onto the rear end of the refuse-engaging stretch 14 of the conveyor. The conveyor is geared to move very slowly and may be operated either continuously or at intervals, depending on the rapidity with which the refuse being collected accumulates on the receiving end of the conveyor.

The refuse after being dumped into the depression 42 is carried forwardly over the elevation 41 into the depression 43, in which latter depression it tends to build up against the upwardly moving section 20 of the conveyor and be tumbled back on itself. When the accumulating refuse builds up to a point where the top of the pile is engaged by the rearwardly extending overhanging section 22 of the conveyor, it will be pressed downwardly, crushed upon itself, kneaded, worked and rolled with the refuse which is being added from time to time to the pile into a progressively more solid compact mass, which mass will continue to increase in size under the action of the rearwardly extending section 22 of the conveyor until a capacity load has been received.

After the vehicle has been loaded in this manner it is driven to the city dump or other point of disposal, where the sill member 45 is either removed or swung out of the way and the direction of travel of the conveyor reversed. This reversal will immediately discharge the entire load through the opening 11 in the rear end of the body, after which the vehicle is ready to be put into service again.

During the loading operation of the vehicle lightweight objects such as empty boxes or crates may at times tend to roll or be thrown rearwardly by the tumbling action of the upwardly and rearwardly extending sections of the conveyor, and to prevent such objects from falling back out through the opening 11 a readily deflectable but normally vertical blocking curtain 52 or other baffle-like member, of either heavy belt-like flexible material or rigid but articulated construction, is preferably suspended from the top 21 of the body at point 53 a little forwardly of the bottom of the depression 42. This curtain will not only serve to stop the rearward movement of any free objects but will also act as a barrier to seal off in a large measure the escape of dust from ashes and the like. It will also tend to conceal from view through the opening 11 the main mass of refuse in the body.

To prevent water or other liquids in the refuse from acculating in the depressions 42 and 43 the inner shell 23 may be provided at the locations of the bottoms of such depressions with drain holes 54, and the bottom 17 of the body may be provided beneath the locations of the drain holes 54 with suitable valved outlets 55.

While the vehicle of the present invention is referred to throughout the description and claims as one for the handling of refuse, it will of course be understood that this term is used in a very general sense and it is to be understood as including within its meaning all kinds of loose or semi-loose materials.

I claim:

1. In a refuse loading and compacting vehicle, a storage body provided with an opening in the rear end of the same through which refuse is adapted to be dumped into the body, a conveyor in the body which extends first forwardly along the bottom of the body from a point adjacent the lower edge of the opening to a point adjacent the front end of the body, then upwardly to a point adjacent the top of the body, and then rearwardly, in vertically spaced relation to the said forwardly extending section, to a point intermediate the length of said forwardly extending section, means for moving the conveyor in a direction to cause refuse dumped through the opening onto the rear end of the forwardly extending section of the conveyor to be carried forwardly in the body along the bottom of the same and progressively compacted upon itself in the body by the action on the refuse of the upwardly and rearwardly extending sections of the conveyor, and means for moving the conveyor in the opposite direction to cause the refuse in the body to be discharged rearwardly along the bottom of the same through the opening.

2. In a refuse loading and compacting vehicle, a storage body provided with an opening in the rear end of the same through which refuse is adapted to be dumped into the body, a conveyor in the body which extends first forwardly along the bottom of the body from a point adjacent the lower edge of the opening to a point adjacent the front end of the body, then upwardly to a point adjacent the top of the body, and then rearwardly, in vertically spaced relation to the said forwardly extending section, to a point intermediate tthe length of said forwardly extending section, means for moving the conveyor in a direction to cause refuse dumped on the rear end of the same to be carried forwardly in the body and progressively compacted upon itself, means for moving the conveyor in the opposite direction to cause the refuse in the body to be discharged rearwardly through the opening, and a sill member detachably secured to the rear end of the body adjacent the lower edge of the opening in the latter in rearwardly shielding relation to the rear end of the forwardly extending section of the conveyor, said sill member being adapted to be displaced when the conveyor is moved in a direction to cause the refuse in the body to be discharged rearwardly through the opening.

3. In a refuse loading and compacting vehicle, a storage body provided with an opening in the rear end of the same through which refuse is adapted to be dumped into the body, a conveyor in the body which extends first forwardly along the bottom of the body from a point adjacent the lower edge of the opening of a point adjacent the front end of the body, then upwardly to a point adjacent the top of the body, and then rearwardly, in vertically spaced relation to the said forwardly extending section, to a point intermediate the length of said forwardly extending section, means for moving the conveyor in a direction to cause refuse dumped on the rear end of the same to be carried forwardly in the body and progressively compacted upon itself, means for moving the conveyor in the opposite direction to cause the refuse in the body to be discharged rearwardly through the opening, a sill member detachably secured to the rear end of the body adjacent the lower edge of the opening in the latter in rearwardly shielding relation to the rear end of the forwardly extending section of the conveyor, said sill member being adapted to be displaced when the conveyor is moved in a direction to cause the refuse in the body to be discharged rearwardly through the opening, and a vertically movable door at the rear end of the body above the removable sill member for closing off the opening.

4. In a refuse loading and compacting vehicle, a storage body provided with an opening in the rear end of the same through which refuse is adapted to be dumped into the body, an endless conveyor in the body having a refuse-engaging stretch and a return stretch, said refuse-engaging stretch of the conveyor extending first forwardly along the bottom of the body from a point adjacent the lower edge of the opening to a point adjacent the front end of the body, then upwardly in a curve to a point adjacent the top of the body, and then rearwardly in a curve, in vertically spaced relation to the said forwardly extending section, to a point intermediate the length of said forwardly extending section, said return stretch of the conveyor following substantially the same path as the refuse-engaging stretch but in reverse, a stationary refuse-engaging inner shell in the body, which inner shell follows the same path as the refuse-engaging stretch of the conveyor and is located between the refuse-engaging stretch and the return stretch, in base-forming cooperation with the refuse-engaging stretch, means for moving the refuse-engaging stretch of the conveyor in a direction to cause refuse dumped on the rear end of the same to be carried forwardly in the body and progressively compacted upon itself, and means for moving the refuse-engaging stretch in the opposite direction to cause the refuse in the body to be discharged rearwardly through the opening.

5. In a refuse loading and compacting vehicle, a storage body provided with an opening in the rear end of the same through which refuse is adapted to be dumped into the body, an endless conveyor in the body having a refuse-engaging stretch and a return stretch, said refuse-engaging stretch of the conveyor extending first forwardly along the bottom of the body from a point adjacent the lower edge of the opening to a point adjacent the front end of the body, then upwardly in a curve to a point adjacent the top of the body, and then rearwardly in a curve, in vertically spaced relation to the said forwardly extending section, to a point intermediate the length of said forwardly extending section, said return stretch of the conveyor following substantially the same path as the refuse-engaging stretch but in reverse, a stationary refuse-engaging inner shell in the body, which inner shell follows the same path as the refuse-engaging stretch of the conveyor and is located between the refuse-engaging stretch and the return stretch, in base-forming cooperation with the refuse-engaging stretch, means for moving the refuse-engaging stretch of the conveyor in a direction to cause refuse dumped on the rear end of the same to be carried forwardly in the body and progressively compacted upon itself, and means for moving the refuse-engaging stretch in the opposite direction to cause the refuse in the body to be discharged rearwardly through the opening, said inner shell being curved first upwardly and then downwardly intermediate the ends of the forwardly extending section of the refuse-engaging stretch of the conveyor, whereby to provide a curved raised portion, a curved depression behind the raised portion and another but larger curved depression in front of the raised portion, and said raised portion being located generally beneath the rear end of the short rearwardly extending section of the refuse-engaging stretch of the conveyor.

6. In a refuse loading and compacting vehicle, a storage body provided with an opening in the rear end of the same through which refuse is adapted to be dumped into the body, an endless conveyor in the body having a refuse-engaging stretch and a return stretch, said refuse-engaging stretch of the conveyor extending first forwardly along the bottom of the body from a point adjacent the lower edge of the opening to a point adjacent the front end of the body, then upwardly in a curve to a point adjacent the top of the body, and then rearwardly in a curve, in vertically spaced relation to the said forwardly extending section, to a point intermediate the length of said forwardly extending section, said return stretch of the conveyor following substantially the same path as the refuse-engaging stretch but in reverse, a stationary refuse-engaging inner shell in the body, which inner shell follows the same path as the refuse-engaging stretch of the conveyor and is located between the refuse-engaging stretch and the return stretch, in base-forming cooperation with the refuse-engaging stretch, means for moving the refuse-engaging stretch of the conveyor in a direction to cause refuse dumped on the rear end of the same to be carried forwardly in the body and progressively compacted upon itself, means for moving the refuse-engaging stretch in the opposite direction to cause the refuse in the body to be discharged rearwardly through the opening, said conveyor consisting of chains located at the sides of the body, and cross flights connected with the chains for sliding engagement with the inner shell in the refuse-engaging stretch of the conveyor, said chains being trained over idler wheels at both ends of the refuse-engaging stretch, and said conveyor moving means including power driven sprockets which engage with the chains at a point intermediate the length of the return stretch of the conveyor.

7. In a refuse loading and compacting vehicle, a storage body provided with an opening in the rear end of the same through which refuse is adapted to be dumped into the body, an endless conveyor in the body having a refuse-engaging stretch and a return stretch, said refuse-engaging stretch of the conveyor extending first forwardly along the bottom of the body from a point adjacent the lower edge of the opening to a point adjacent the front end of the body, then upwardly in a curve to a point adjacent the top of the body, and then rearwardly in a curve, in vertically spaced relation to the said forwardly extending section, to a point intermediate the length of said forwardly extending section, said return stretch of the conveyor following substantially the same path as the refuse-engaging stretch but in reverse, a stationary refuse-engaging inner shell in the body, which inner shell follows the same path as the refuse-engaging stretch of the conveyor and is located between the refuse-engaging stretch and the return stretch, in base-forming cooperation with the refuse-engaging stretch, means for moving the refuse-engaging stretch of the conveyor in a direction to cause refuse dumped on the rear end of the same to be carried forwardly in the body and progressively compacted upon itself, means for moving the refuse-engaging stretch in the opposite direction to cause the refuse in the body to be discharged rearwardly through the opening, said conveyor consisting of chains located at the sides of the body, and cross flights connected with the chains for sliding engagement with the inner shell in the refuse-engaging stretch of the conveyor, said chains being trained over idler wheels at both ends of the refuse-engaging stretch, and said conveyor moving means including power driven sprockets which engage with the chains at a point intermediate the length of the return stretch of the conveyor, and guide flanges along the sides of the body in close and uniformly spaced relation to the sides of the inner shell for causing the chains of the conveyor in the refuse-engaging stretch thereof to follow the surface of the inner shell.

8. In a refuse vehicle, a storage body provided with an opening in one wall of the same through which refuse is adapted to be dumped into the body, a refuse moving conveyor in the body which extends along the bottom of the body from a point adjacent the lower edge of the opening to a point adjacent the far wall of the body and is then looped back on itself for a distance adjacent the top of the body, means for moving the conveyor in one direction to cause refuse dumped through the opening onto the conveyor to be carried away from the opening along the bottom of the body toward the far wall and progressively compacted upon itself adjacent the far wall by the action on the refuse of the looped portion of the conveyor, and means for moving the conveyor in the opposite direction to unload the body through the opening.

9. In a refuse vehicle, a storage body provided with an opening adjacent its rear end through which refuse is adapted to be dumped onto the bottom of the body adjacent that end, refuse conveying and compacting means within the body comprising a plurality of interconnected transversely extending longitudinally spaced flights, means for moving the flights longitudinally of the body along the bottom, front end wall and top of the body, and means for guiding the flights to cause the same to move first forwardly along the upper surface of the bottom of the body, with the flights facing upwardly, then upwardly at the front end of the body to a point adjacent the top of the body, with the flights facing rearwardly, and then rearwardly along the underside of the top of the body, with the flights facing downwardly, whereby refuse moved forwardly along the bottom of the body by the flights will be turned back and compacted on itself in the body by the upwardly moving and rearwardly moving flights, and means for reversing the direction of movement of the flights.

References Cited in the file of this patent
UNITED STATES PATENTS

| | | |
|---|---|---|
| 1,094,734 | Marek | Apr. 28, 1914 |
| 1,258,377 | Stuart | Mar. 5, 1918 |
| 2,130,099 | Peterson | Sept. 13, 1938 |
| 2,157,765 | Lanter | May 9, 1939 |
| 2,496,305 | Ortmeier | Feb. 7, 1950 |
| 2,573,193 | Goldsberry | Oct. 30, 1951 |
| 2,778,484 | Foster | Jan. 22, 1957 |
| 2,823,814 | Schonrock | Feb. 18, 1958 |